US 6,685,103 B2

(12) United States Patent
Hosi et al.

(10) Patent No.: US 6,685,103 B2
(45) Date of Patent: Feb. 3, 2004

(54) STRAW TUBE, AND APPARATUS AND METHOD FOR PRODUCING THE SAME

(75) Inventors: Katumasa Hosi, Saitama (JP);
Kiyokazu Ishiwatari, Kanagawa (JP);
Minoru Suyama, Tokyo (JP)

(73) Assignee: Showa Denko Plastic Products Co., Ltd., Tokyo (JP)

( * ) Notice: Subject to any disclaimer, the term of this patent is extended or adjusted under 35 U.S.C. 154(b) by 0 days.

(21) Appl. No.: 09/813,945

(22) Filed: Mar. 22, 2001

(65) Prior Publication Data
US 2001/0023899 A1 Sep. 27, 2001

Related U.S. Application Data
(60) Provisional application No. 60/249,293, filed on Nov. 17, 2000.

(30) Foreign Application Priority Data

Mar. 23, 2000 (JP) ..................... P2000-082971
Jul. 11, 2000 (JP) ..................... P2000-210372

(51) Int. Cl.$^7$ ........................ A61J 15/00; A47G 21/18
(52) U.S. Cl. ........................ 239/33; 239/24; D7/300.2
(58) Field of Search ..................... 239/24, 33; D7/300.2

(56) References Cited

U.S. PATENT DOCUMENTS

| 4,657,182 A | * | 4/1987 | Hoshi ........................... 239/33 |
| 4,850,533 A | * | 7/1989 | Hoshi et al. ................... 239/33 |
| 5,039,012 A | * | 8/1991 | Inaba ........................... 239/33 |
| 5,820,023 A | | 10/1998 | Kristensson |

FOREIGN PATENT DOCUMENTS

| JP | 59-41179 A | 3/1984 |
| JP | 62-57526 | 3/1987 |
| JP | 63-28606 B | 6/1988 |
| JP | 3023252 | 1/1996 |
| JP | 10-225996 | 8/1998 |
| TW | 280161 | 7/1996 |
| TW | 327783 | 3/1998 |
| WO | WO 9112755 A1 * | 9/1991 ................. 239/33 |

OTHER PUBLICATIONS

Derwent WPI for JP 63–89326 A (Apr. 20, 1988).

* cited by examiner

Primary Examiner—Robin O. Evans
(74) Attorney, Agent, or Firm—Sughrue Mion, PLLC

(57) ABSTRACT

An object of the present invention is to provide a straw tube capable of preventing reduction of pressure inside a drinking container when sucked, an apparatus, and a method for producing the straw tube and for using the apparatus. A straw tube has a tube body having a plurality of grooves extending in the longitudinal direction and a convex streak sandwiched by these grooves and projecting outward from the datum level of the outer circumferential wall. An apparatus has a rotating drum having tube loading grooves, a female rod having grooves and capable of reciprocating within the tube loading grooves by a cam mechanism, and a male roller having convex streaks corresponding to the grooves of the female rod so that the grooves of the female rod engage with the convex streaks through the tube and the female rod and the male roller are synchronized.

14 Claims, 10 Drawing Sheets

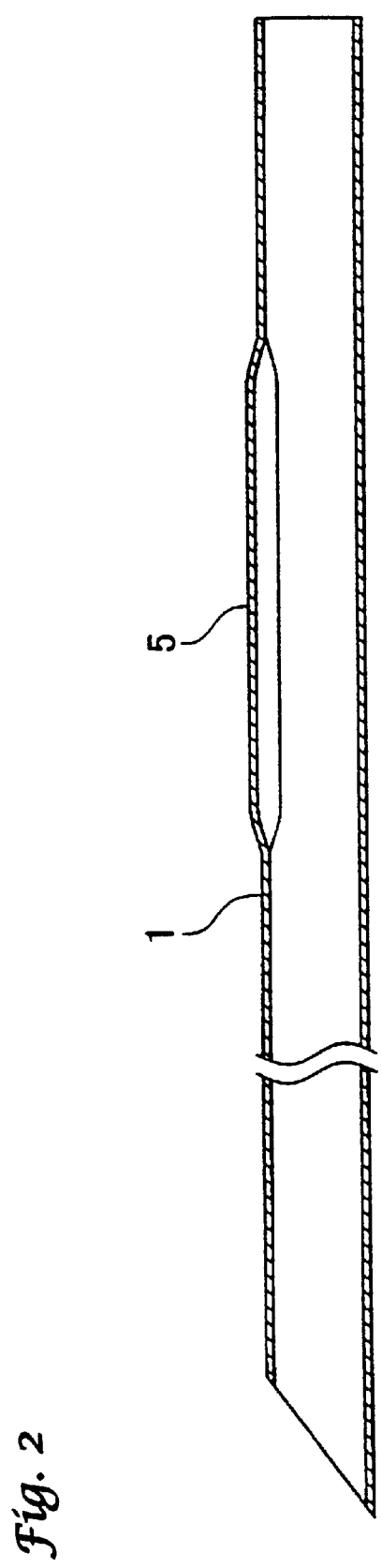

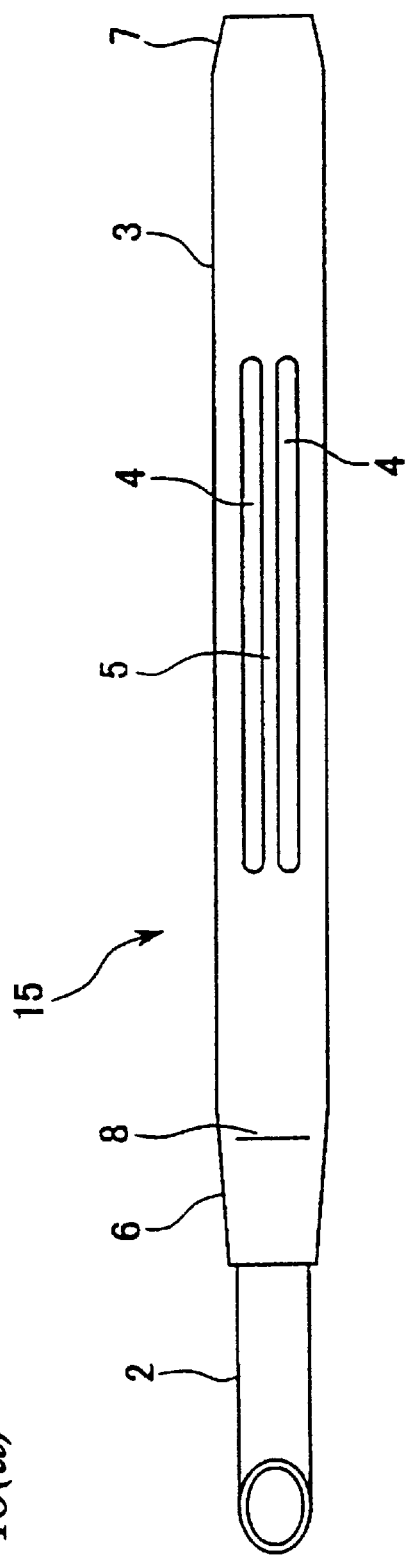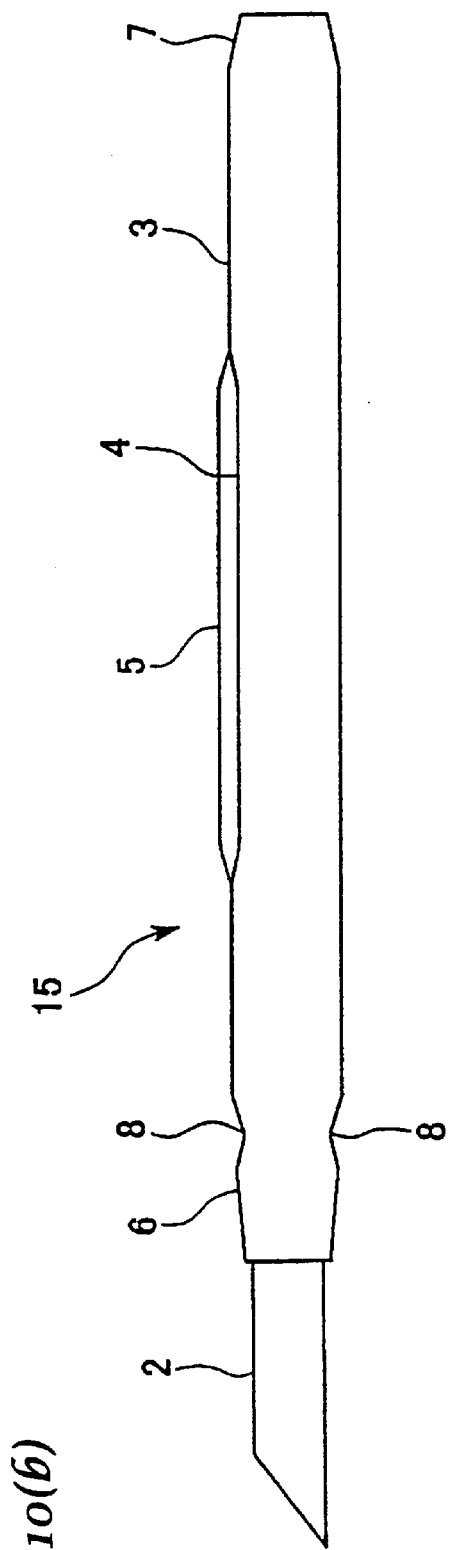
Fig. 10(a)
Fig. 10(b)

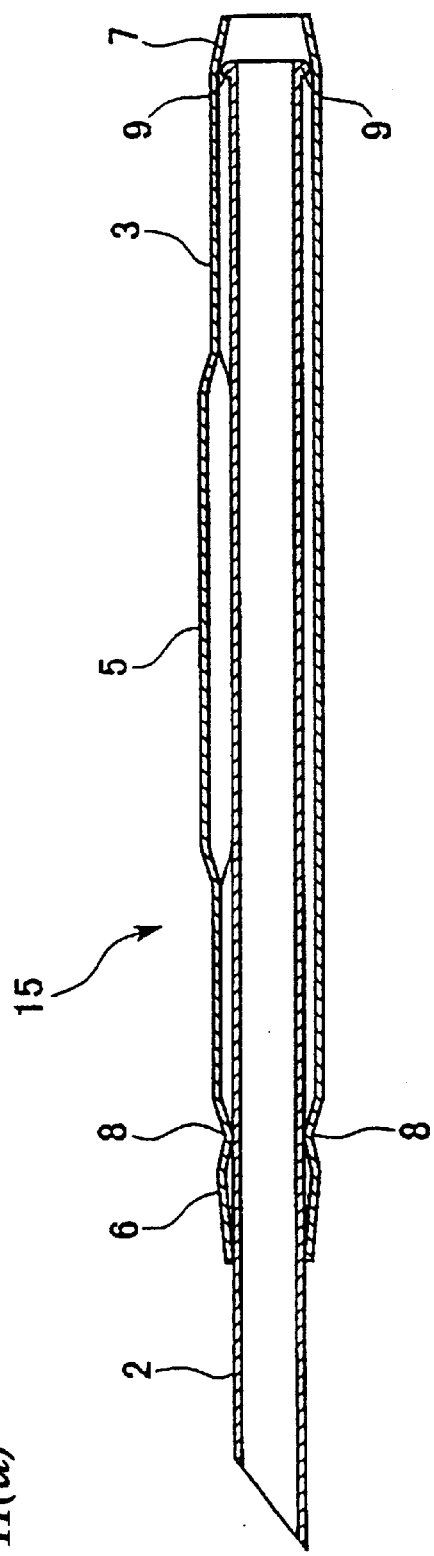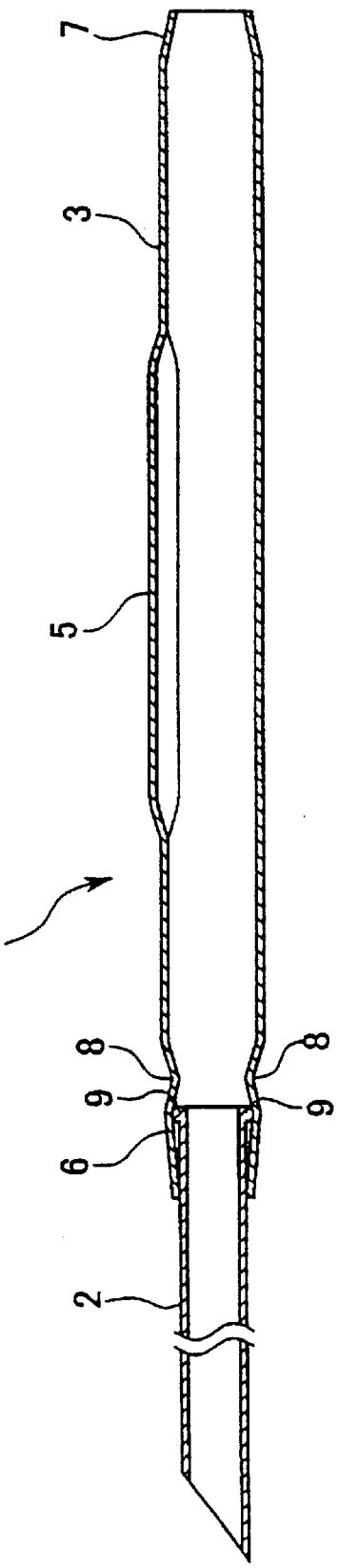
Fig. 11(a)
Fig. 11(b)

STRAW TUBE, AND APPARATUS AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/249,293 filed Nov. 17, 2000 pursuant to 35 U.S.C. §111(b).

FIELD OF THE INVENTION

The present invention relates to a straw tube for sucking a drink in a drinking container. More specifically, the present invention relates to a straw tube capable of preventing the pressure inside the drinking container from decreasing while sucking.

BACKGROUND OF THE INVENTION

Beverage products enabling drinking of a drink in a drinking container by inserting a straw tube into a closed drinking container having a hollow part in the inside thereof are available on the market.

FIG. 12 is a view showing one example of a beverage product. This beverage product 40 is constructed by a rectangular parallele-piped container body 42 having formed on the upper surface thereof a sucking hole 41 sealed with a plastic film or the like and a two-stage straw tube 44 housed in a bag 43 and fixed to the lateral side of the container body 42. The "two-stage straw tube" as used herein means a straw tube where an inner tube and an outer tube different in the diameter are combined to allow free sliding for extension or retraction.

When drinking a drink in the container body 42, the two-stage straw tube 44 is extended by sliding the inner tube 45 and the outer tube 46, the plastic film sealing the sucking hole 41 is broken through by the distal end of the two-stage straw tube 44, the two-stage straw tube 44 is inserted into the container body 42. Then, the drink in the container body 42 is sucked through the basal end of the two-stage straw tube 44.

However, when the two-stage straw tube 44 is inserted into the container body 42 and the drink in the container body 42 is sucked, the pressure inside the container body 42 is reduced. As a result, the container body 42 is deformed, making the drinking inconvenient or when the sucking is interrupted or finished, air abruptly enters into the container body 42 through the two-stage straw tube 44 to generate uncomfortable noises.

To overcome these problems, a straw tube having a groove formed on the outer circumferential wall of the outer tube and extending in the longitudinal direction has been proposed, for example, in JP-U-A-59-70574 (the term "JP-U-A" as used herein means an "unexamined published Japanese utility model application"), JP-U-B-3-49570 (the term "JP-U-B" as used herein means an "examined Japanese utility model publication"), Japanese Patent No. 2582005, JP-A-7-163450 (the term "JP-A" as used herein means an "unexamined published Japanese patent application"), Registered Design No. 957695, JP-A-7-222664, JP-A-7-222665 and JP-A-7-322948.

As shown in FIG. 13, the straw tube having forming thereon such a groove can form a void 48 between the peripheral edge 47 of the sucking hole 41 on the container body 42 and the groove 51 on the straw tube 50, so that an air can be introduced even at the time of sucking. As a result, the pressure inside the container body 42 can be prevented from decreasing and the deformation of the container body 42 or the generation of uncomfortable noises can be inhibited.

However, the groove 51 on the straw tube 50 is shallow and therefore, the void 48 formed between the peripheral edge 47 of the sucking hole 41 and the groove 51 on the straw tube 50 is small. Depending on the case, the peripheral edge 47 of the sucking hole 41 is accustomed to the groove 51 on the straw tube 50 and the peripheral edge 47 of the sucking hole 41 clogs the void 48 during sucking. As a result, the pressure inside the container body 42 is often reduced.

SUMMARY OF THE INVENTION

Accordingly, an object of the present invention is to provide a straw tube for a drinking container of a type such that a straw tube is inserted into a hole provided on a drinking container and the drink is sucked through the straw tube, which can prevent the pressure inside the drinking from decreasing while sucking to ensure convenient drinking and no generation of uncomfortable noises. Another object of the present invention includes providing an apparatus and a method for producing the straw tube.

More specifically, the straw tube of the present invention comprises a tube having formed on the outer circumferential wall thereof a groove extending in the longitudinal direction and a convex streak adjacent to the groove and projecting outward from the datum level of the outer circumferential wall.

Also, the straw tube of the present invention comprises a tube having formed on the outer circumferential wall thereof a plurality of grooves extending in the longitudinal direction and a convex streak sandwiched by these grooves and projecting outward from the datum level of the outer circumferential wall.

The straw tube of the present invention may be a multi-stage straw tube comprising two or more tubes different in the diameter and combined to allow free sliding for extension or retraction.

The straw tube of the present invention may be a straw tube wherein a groove and a convex streak are formed on the outer circumferential wall of at least one tube of the two or more tubes.

The straw tube of the present invention may be a straw tube wherein a groove and a convex streak are formed on the outer circumferential wall of the outermost tube located in the outermost side of the two or more tubes.

Preferably, the number of the grooves is two and one convex streak is formed therebetween to come adjacent to these grooves.

The groove and the convex streak each preferably has a length of ⅓ to ¾ the length of the tube on which the groove and the convex streak are formed.

The convex streak preferably has a height of 0.05 to 1.0 mm from the datum level of the outer circumferential wall of the tube on which the convex streak is formed.

The groove preferably has a depth of 0.1 to 0.8 mm from the datum level of the outer circumferential wall of the tube on which the groove is formed.

The straw tube of the present invention preferably comprises a propylene-α-olefin random copolymer having a melt flow index of 3 to 16 g/10 min.

The propylene-α-olefin random copolymer is preferably a propylene-ethylene random copolymer.

The ethylene content of the propylene-ethylene random copolymer is preferably from 2 to 20% by mass.

Furthermore, the straw tube of the present invention preferably comprises a propylene-α-olefin block copolymer having a melt flow index of 3 to 16 g/10 min.

The propylene-α-olefin block copolymer is preferably a propylene-ethylene block copolymer.

The ethylene content of the propylene-ethylene block copolymer is preferably from 2 to 20% by mass.

Still further, the straw tube of the present invention preferably comprises a homopolypropylene having a melt flow index of 3 to 16 g/10 min.

The apparatus for producing a straw tube of the present invention is an apparatus used for producing a straw tube comprising a tube having formed on the outer circumferential wall thereof a plurality of grooves extending in the longitudinal direction and a convex streak sandwiched by these grooves and projecting outward from the datum level of the outer circumferential wall. The apparatus comprises a rotating drum having formed on the outer circumferential wall thereof a plurality of tube loading grooves into which tubes are loaded and which extend in the axial direction, a female rod capable of being inserted into or drawn out from a tube within the tube loading groove by the reciprocation of a cam mechanism and having a plurality of grooves formed at the position corresponding to the surface of a tube exposed from the tube loading groove, and a male roller having a male mold which has convex streaks corresponding to the grooves of said female rod and is provided at a plurality of portions on the circumferential wall. The male roller is disposed such that the grooves of the female rod and the convex streaks of the male roller engage through a tube and wherein the female rod and the male roller are synchronized.

In the apparatus for producing a straw tube of the present invention, the female rod preferably has two grooves and the male mold provided on the male roller preferably has two convex streaks.

The method for producing a straw tube is a method for producing a straw tube comprising a tube having on the outer circumferential wall thereof a plurality of grooves extending in the longitudinal direction and a convex streak sandwiched by these grooves and projecting outward from the datum level of the outer circumferential wall. The method comprises a step of loading a tube into a tube loading groove formed on the outer circumferential wall of a rotating drum and extending in the axial direction thereof, a step of inserting into the tube a female rod having a plurality of grooves formed at the position corresponding to the surface of the tube exposed from the tube loading grooves, and a step of engaging the grooves of the female rod within the tube and the convex streaks of a male mold provided on a male roller, through the tube.

In the method for producing a straw tube of the present invention, the female rod preferably has two grooves and the male mold provided on the male roller preferably has two convex streaks.

BRIEF DESCRIPTION OF THE DRAWINGS

FIG. 1(*b*) is a side view showing one example of the straw tube of the present invention.

FIG. 2 is a cross section showing one example of the straw tube of the present invention.

FIG. 10(*a*) is a top view showing another example of the straw tube of the present invention.

FIG. 10(*b*) is a side view showing another example of the straw tube of the present invention.

FIG. 11(*a*) is a cross section showing the state where the inner tube is housed in the outer tube of the present invention.

FIG. 11(*b*) is a cross section showing the state where the tube of the present invention is extended.

DESCRIPTION OF THE PREFERRED EMBODIMENTS

Figure 1A:
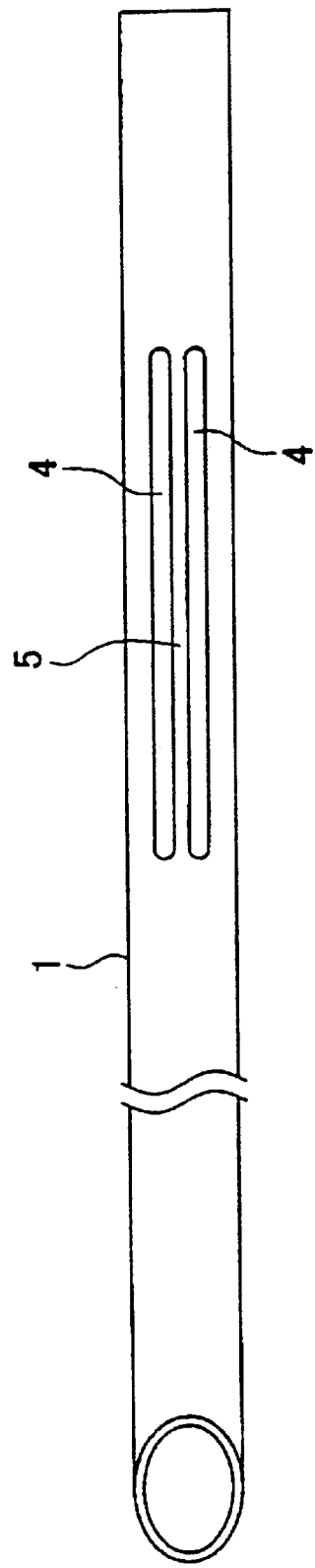
FIG. 1(*a*) is a top view showing one example of the straw tube of the present invention.

The present invention is described in detail below.

FIGS. 1(*a*), 1(*b*) and 2 each is a view showing one embodiment of the straw tube of the present invention.

In this straw tube, two grooves 4,4 are formed on the outer circumferential wall of a tube body 1 to extend in the longitudinal direction thereof and a convex streak 5 projecting outward from the datum level of the outer circumferential wall is formed between these grooves 4,4.

The lengths of the groove 4 and the convex streak 5 are not particularly limited and may be sufficient if each is adjusted such that when a straw tube is inserted into a drinking container, the convex streak comes into contact with a sucking hole of the drinking container. However, in view of practical use and production, each length is preferably from ⅓ to ¾ the length of the straw tube. If the lengths of the groove 4 and the convex streak 5 each is less than ⅓ the length of the straw tube, the convex streak 5 may not come into contact with the sucking hole of the drinking container depending on the length where the straw tube is inserted into the drinking container. If the lengths of the groove 4 and the convex streak 5 each exceeds ¾ the length of the straw tube, a sufficiently secured engagement may not be attained at the joint part between the straw inner tube and the straw outer tube.

The height of the convex streak 5 is not particularly limited and may be sufficient if the convex streak 5 is high enough that when the straw tube is inserted into the drinking container, the convex streak 5 can expand the sucking hole of the drinking container. However, in view of practical use and production, the height of the convex streak 5 is preferably from 0.05 to 1.0 mm from the datum level of the outer circumferential wall of the tube body 1. If the height of the convex streak 5 is less than 0.05 mm from the datum level of the outer circumferential wall of the tube body 1, the effect of expanding the sucking hole of the drinking container may not be sufficient. If the height of the convex streak 5 exceeds 1.0 mm from the datum level of the outer circumferential wall of the tube body 1, the formation of the convex streak 5 becomes difficult.

The "datum level of the outer circumferential wall" as used herein means the surface of the outer circumferential wall of the tube body 1 where the groove 4 and the convex streak 5 are not formed.

The depth of the groove 4 is not particularly limited and may be sufficient if the groove 4 is deep enough that when the straw tube is inserted into the drinking container, the groove 4 is not accustomed to the sucking hole of the drinking container. However, in view of practical use and production, the depth of the groove 4 is preferably from 0.1 to 0.8 mm from the datum level of the outer circumferential wall of the tube body 1. If the depth of the groove 4 is less than 0.1 mm from the datum level of the outer circumferential wall of the tube body 1, the groove 4 becomes accustomed to the sucking hole of the drinking container and the void formed between the sucking hole and the groove 4 may be clogged. If the depth of the groove 4 exceeds 0.8 mm from the datum level of the outer circumferential wall of the tube body 1, the formation of the groove 4 becomes difficult.

Examples of the construction material of the straw tube include polyolefin-base resin (e.g., polyethylene, polypropylene), polystyrene, ABS resin and paper. Among these, polypropylene is preferred. Specifically, a propylene homopolymer and a block or random copolymer of propylene with another α-olefin are suitably used.

Among these polypropylenes, a propylene-α-olefin random copolymer, a propylene-α-olefin block copolymer and a homopolypropylene each having a melt flow index of 3 to 16 g/10 min are more suitably used because the convex streak 5 can be easily formed to project from the datum level of the outer circumferential wall when processing the tube body 1.

If the melt flow index of the propylene-α-olefin random copolymer, propylene-α-olefin block copolymer or homopolypropylene is less than 3 g/10 min, the convex streak 5 is difficult to form by projecting it from the datum level of the outer circumferential wall when processing the tube body 1 or the tube body 1 may be broken. If the melt flow index thereof exceeds 16 g/10 min, the groove 4 is readily crushed when processing the tube body 1 or the roundness of the tube body 1 may be impaired.

The "melt flow index" as used herein means a value measured in accordance with JIS K7210.

Among these propylene-α-olefin random copolymers and propylene-α-olefin block copolymers, a propylene-ethylene random copolymer and a propylene-ethylene block copolymer are more suitably used because the convex streak 5 can be easily formed to project from the datum level of the outer circumferential wall when processing the tube body 1. These propylene-ethylene random copolymer and propylene-ethylene block copolymer each preferably has an ethylene content of 2 to 20% by mass. If the ethylene content is less than 2% by mass, the convex streak 5 is difficult to form by projecting it from the datum level of the outer circumferential wall when processing the tube body 1 or the tube body 1 may be broken. If the ethylene content exceeds 20% by mass, the portions of the groove 4 and the convex streak 5 may be whitened.

Figure 3:
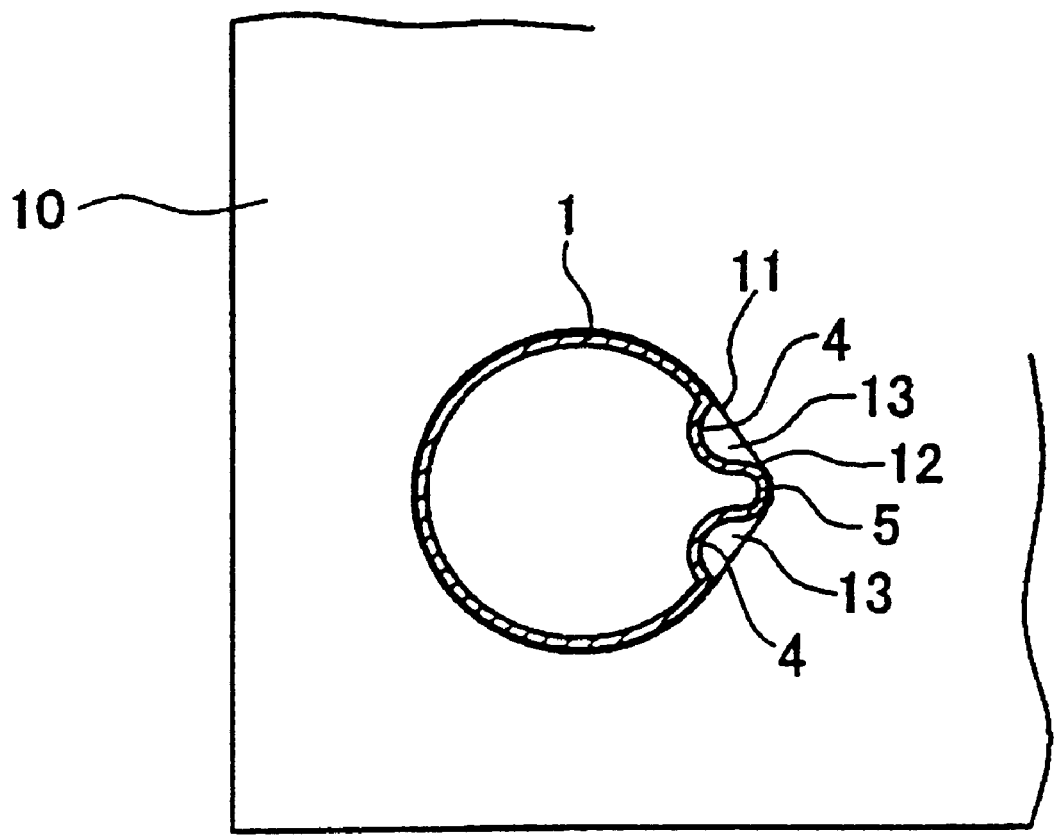
FIG. 3 is a top view showing the state where the straw tube of the present invention is inserted into a drinking container.

As shown in FIG. 3, when this straw tube is inserted into the sucking hole 11 of a drinking container body 10, the convex streak 5 can expand the peripheral edge 12 of the sucking hole 11 to form voids 13,13 between the grooves 4,4 and the peripheral edge 12 of the sucking hole 11. The state of the convex streak 5 expanding the peripheral edge 12 of the sucking hole 11 is always maintained and therefore, the peripheral edge 12 of the sucking hole 11 is prevented from becoming accustomed to the grooves 4,4 to clog the voids 13,13. As a result, the reduction in the pressure inside the container body 10 can be prevented and the container body 10 can be inhibited from deformation or generation of uncomfortable noises can be inhibited.

This operation effect can first be exhibited when two grooves 4,4 and one convex streak 5 sandwiched by these grooves 4,4 and projecting from the datum level of the outer circumferential wall of the tube body 1 are provided in combination. In other words, if only two grooves are provided, a sucking hole cannot be expanded and the void between the peripheral edge of the sucking hole and the groove may be clogged by the peripheral edge of the sucking hole.

In the case of the straw tube shown in the FIG. 3, two grooves are formed on the outer circumferential wall of the tube body 1 and one convex streak is formed therebetween adjacent to these grooves. However, the straw tube of the present invention is not limited to this embodiment. For example, a straw tube having one groove and one convex streak adjacent thereto; a straw tube having three grooves and two convex streaks between and adjacent to these grooves; and a straw tube having four grooves and three convex streaks between and adjacent to these grooves, may be used. However, the effect of preventing the pressure inside the container body from decreasing can be sufficiently exhibited by a straw tube having two grooves and one convex streak between and adjacent to these grooves. Therefore, taking into account the easiness in formation or the like, a straw tube having two grooves and one convex streak is preferred.

An apparatus for producing the straw tube and a method for producing a straw tube using the apparatus are described below.

Figure 4:
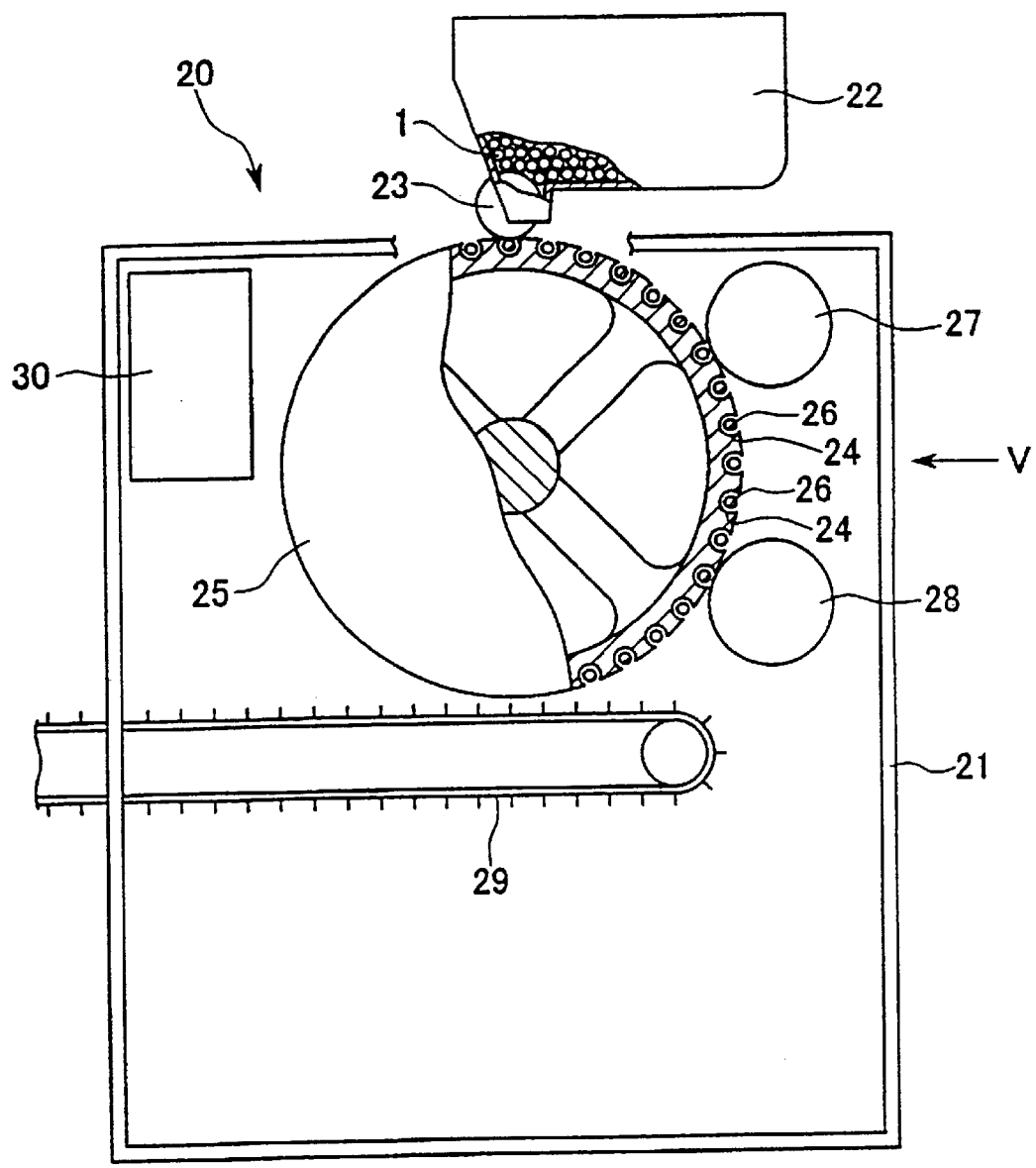
FIG. 4 is a schematic view showing one example of the apparatus for producing a straw tube of the present invention.

Examples of the apparatus for producing a straw tube include a production apparatus roughly structured by having a tube forming device (not shown) for forming an annular tube body 1 having a predetermined length and a tube processing device 20 shown in FIG. 4 for forming a groove 4 and a convex streak 5 on this tube body 1.

Figure 5:
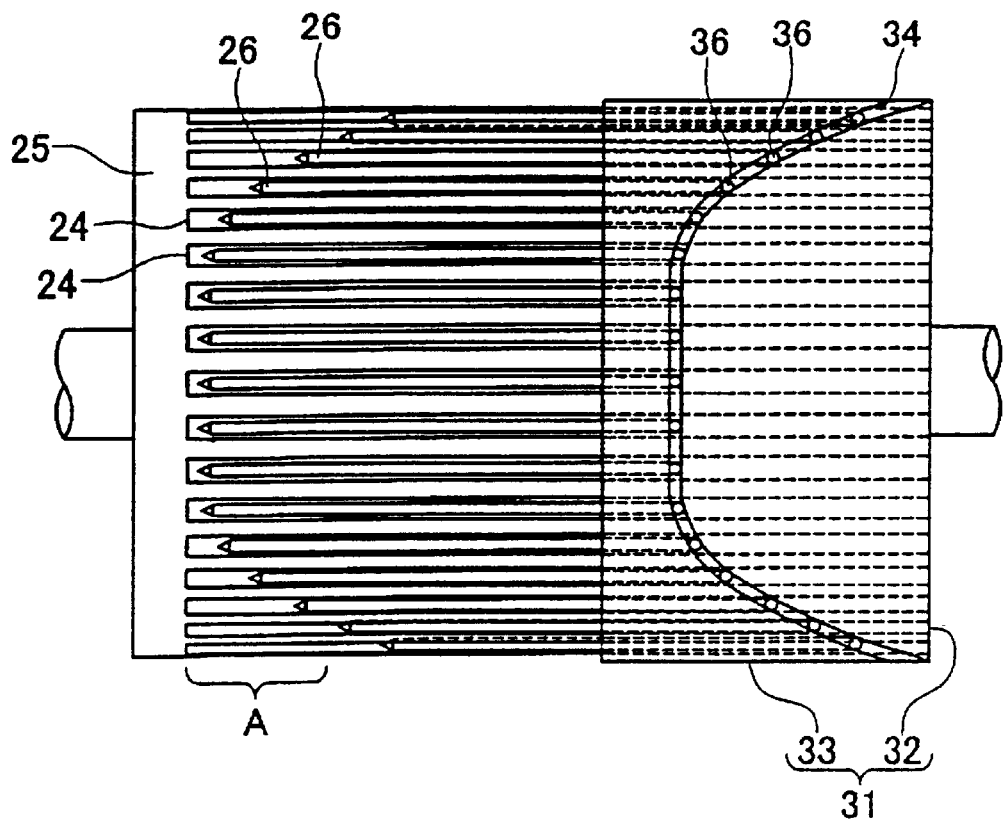
FIG. 5 is a side view showing the rotating drum viewed from the V direction of FIG. 4.

As shown in FIGS. 4 and 5, the tube processing device 20 comprises a frame 21, a hopper 22 provided at the upper portion of the frame 21 and housing a large number of tube bodies 1 fed from the tube forming device (not shown), a rotating drum 25 provided within the frame 21 and having a plurality of tube loading grooves 24, 24 into which the tube bodies 1 fed from the feed roller 23 of the hopper 22 are loaded and which are formed at equal intervals on the outer circumferential wall to extend in the axial direction, a heating roller 27 (heating device) for heating the tube body 1 within the tube loading groove 24, a cam floor 31 (cam mechanism) provided by fixing it to the frame 21 to cover the basal end of the rotating drum 25, female rods 26,26 capable of being inserted into or drawn out from the tube body 1 within the tube loading groove 24 by the reciprocation of the cam floor, a male roller 28 having a male mold which has convex streaks corresponding to the grooves of the female rod 26 and is provided at a plurality of positions on the outer circumferential wall, a belt conveyer 29 for transporting the tube body 1 fallen from the rotating drum 25, and a control box 30.

The cam floor 31 is constructed by a pair of a rod push guide 32 and a rod return guide 33 which are provided to cover the outer periphery of the rotating drum 25 at a distance to prevent contact with the rotating drum 25.

The rod push guide 32 and the rod return guide 33 are fixed to the frame 21 to have a constant spacing 34 therebetween and provided independently of the rotating drum 25 so as not to rotate together with the rotating drum 25.

Figure 6:
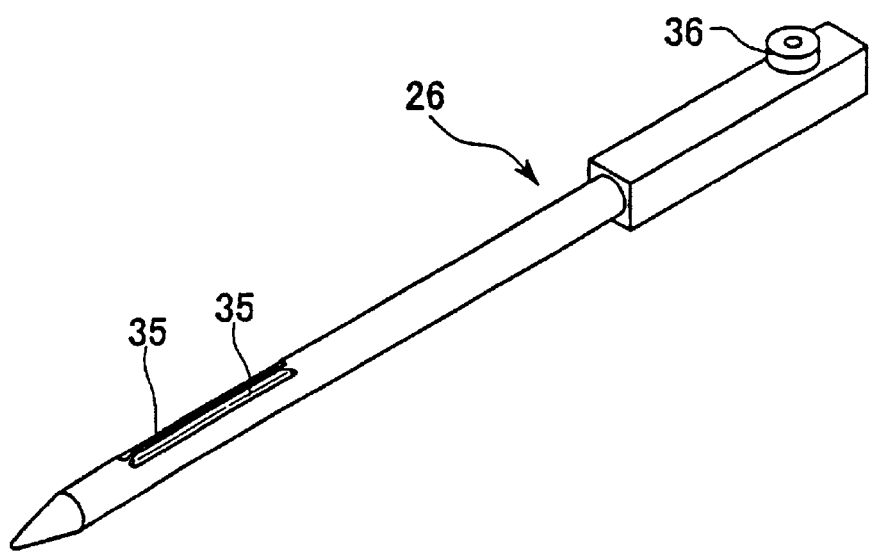
FIG. 6 is a view showing the female rod of the apparatus for producing a straw tube of the present invention.

On the female rod 26, as shown in FIG. 6, two grooves 35,35 are formed at the position corresponding to the surface of the tube body 1 exposed from the tube loading groove 24 and at the basal end, a roller 36 is axially supported. By moving this roller 36 along the spacing 34 between the rod push guide 32 and the rod return guide 33 of the cam floor 31 according to the rotation of the rotating drum 25, the frame rod 26 is reciprocated within the tube loading groove 24 and in the tube loading area A shown in FIG. 5, and the female rod 26 is inserted into the tube body 1 or drawn out from the tube body 1.

Figure 7:
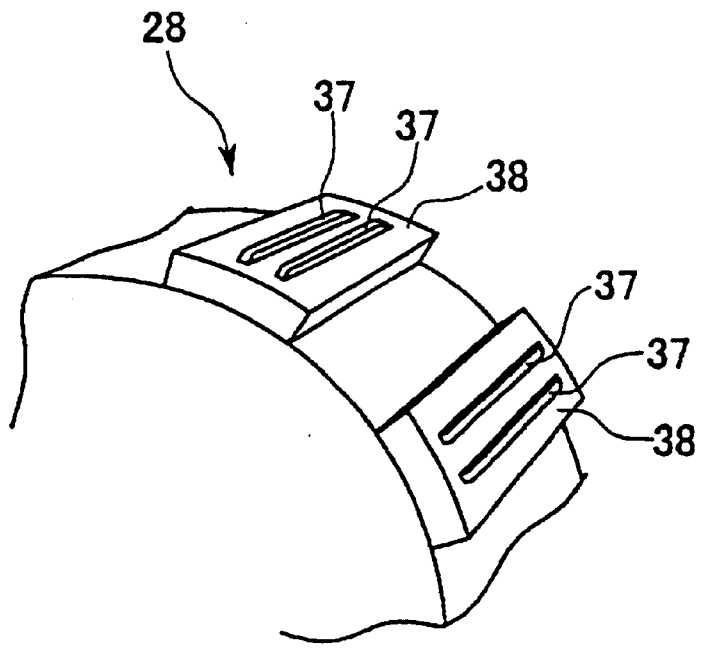
FIG. 7 is a perspective view showing the male roller of the apparatus for producing a straw tube of the present invention.

As shown in FIG. 7, male molds 38,38 each having convex streaks 37,37 corresponding to the grooves 35,35 of the female rod 26 are provided at equal intervals at a plurality of positions on the outer circumferential wall of the male roller 28.

The male roller 28 is disposed such that the grooves 35,35 of the female rod 26 engage with the convex streaks 37,37 of the male roller 28, and at the same time, the female rod 26 and the male roller 28 are synchronized.

In the example shown, two grooves are provided on the female rod and two convex streaks are provided on the male mold of the male roller. However, as long as a groove can be formed on the outer circumferential wall of the tube to extend in the longitudinal direction and a convex streak can be formed adjacent to the groove and project outward from the datum level of the outer circumferential wall, the number of grooves on the female rod and the number of convex streaks of the male roller are not particularly limited to the example shown in the Figure. However, if the number of grooves on the female rod and the number of convex streaks of the male mold provided on the male roller increase. It is difficult to draw the female rod out from the tube and the formation of grooves and convex streaks on the tube becomes difficult. Therefore, the number of grooves on the female rod and the number of convex streaks of the male mold provided on the male roller is suitably 2 on each.

The cam mechanism is not limited to the cam floor of the example shown in the Figure and other forms may also be used as long as the female rod can be reciprocated.

The heating device is also not limited to the heating roller of the example shown in the figure, and other heating devices may be used as long as the tube body 1 can be heated.

On the outer circumferential wall of the rotating drum 25, a belt for preventing dropping of the tube body 1 may be provided to extend from the vicinity of the feed roller 23 of the hopper 22 to the upper portion of the belt conveyer 29 while not contacting the heating roller 27 and the male roller 28.

A straw tube is produced as follows using this apparatus for producing a straw tube.

In a tube forming device (not shown), a tube body 1 having a predetermined length is previously formed.

The tube bodies 1 fed from the tube forming device and housed in a hopper 22 are loaded one by one through a feed roller 23 into the tube loading area A within a tube loading groove 24 formed on the outer circumferential wall of a rotating drum 25 and extending in the axial direction thereof.

Figure 8:
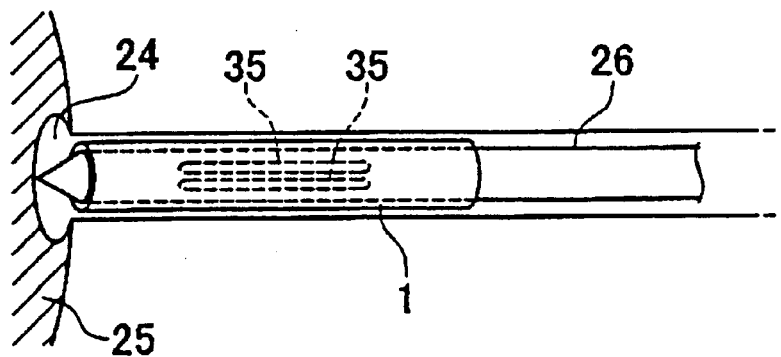
FIG. 8 is a perspective view showing the state where the female rod is inserted into the outer tube.

As the rotating drum 25 is rotated, the female rod 26 is pushed out by the cam floor 31 and, as shown in FIG. 8, inserted into the tube body 1 such that the grooves 35,35 are in the positions corresponding to the surface of the tube body 1 exposed from the tube loading groove 24.

Subsequently, the tube body 1 loaded into the tube loading groove 24 is heated by a heating roller 27 contacting the rotating drum 25.

Figure 1B:
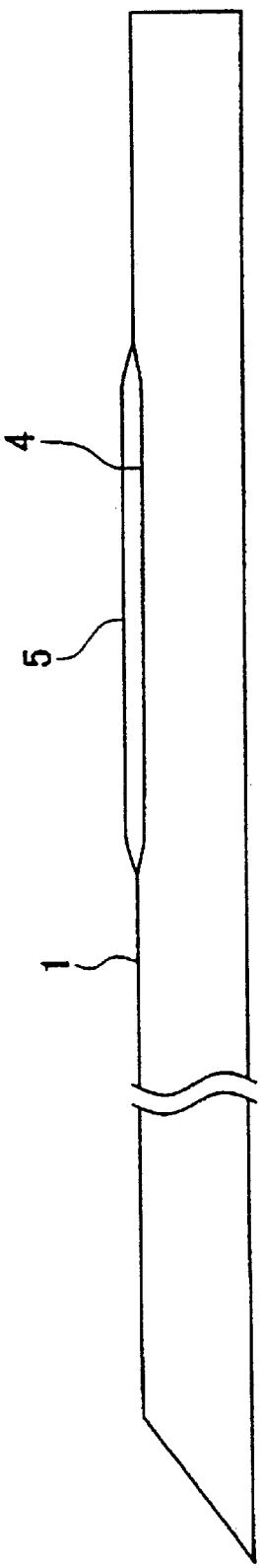
Figure 9:
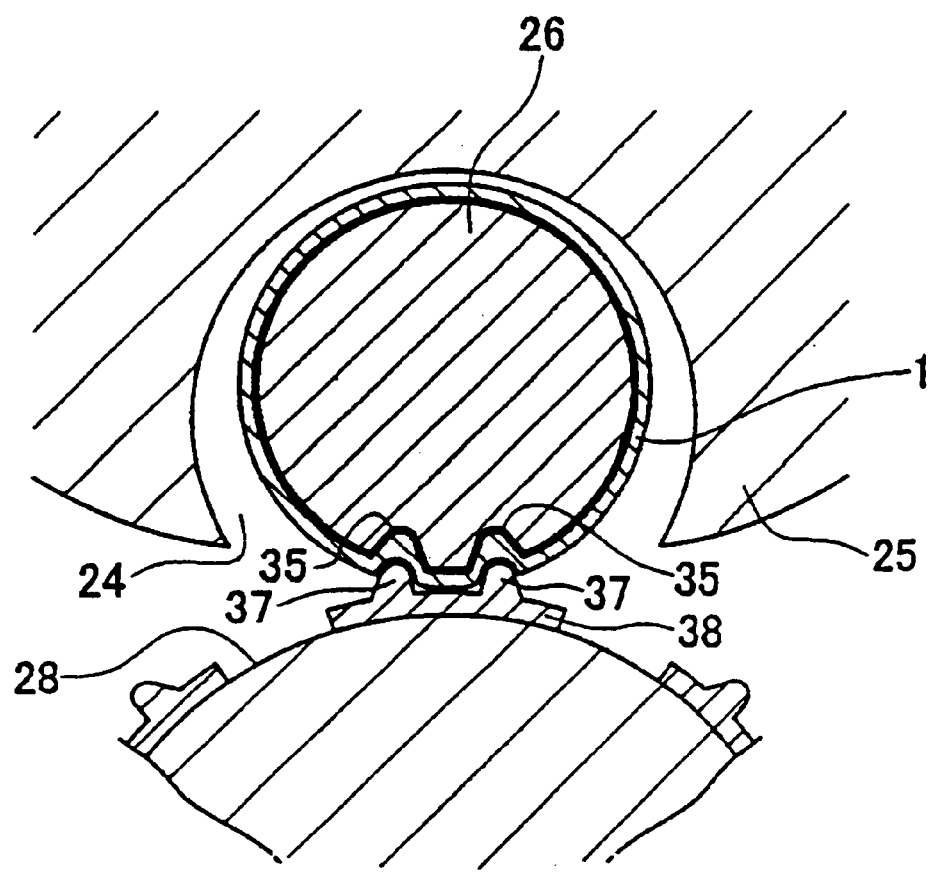
FIG. 9 is a cross section showing the state where the grooves of the female rod are engaged with the convex streaks of the male mold provided on the male roller, through the heated tube.
Figure 12:
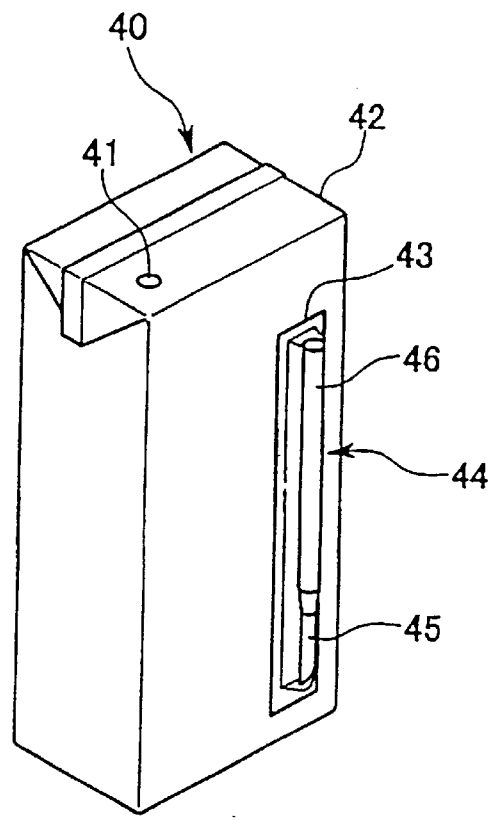
FIG. 12 is a perspective view showing one example of the drinking container.
Figure 13:
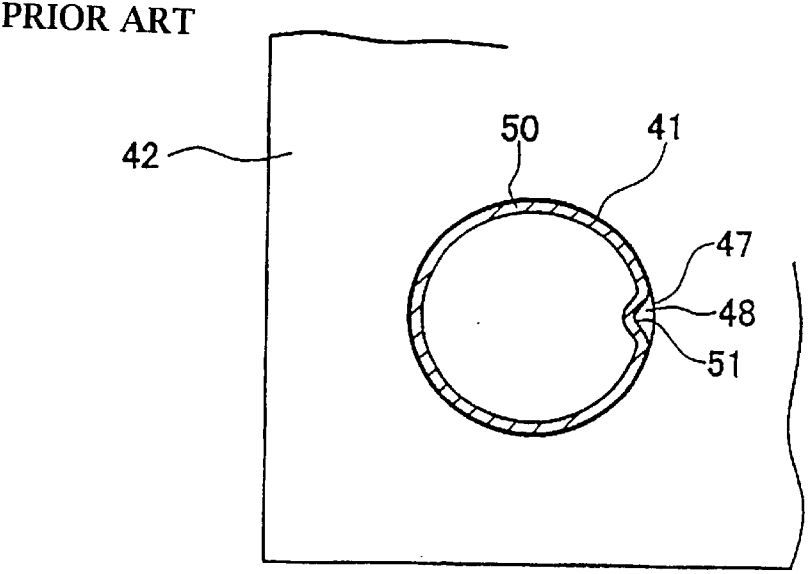
FIG. 13 is a perspective view showing the state where a conventional straw tube is inserted into a drinking container.

After heating the tube body 1, as shown in FIG. 9, the grooves 35,35 of the female rod 26 present within the tube body 1 and the convex streaks 37,37 of the male mold 38 provided on the male roller 28 corresponding to the grooves 35,35 of the female rod 26 are engaged through the heated tube body 1, whereby forming two grooves 4,4 extending in the longitudinal direction as shown in FIG. 1(a) and FIG. 1(b) and a convex streak 5 sandwiched by these grooves 4,4 and projecting outward from the datum level of the outer circumferential wall on the outer circumferential wall of the tube body 1.

This technique of forming a convex streak 5 sandwiched by the grooves 4,4 and projecting outward from the datum level of the outer circumferential wall of the tube body 1 is considered to be a novel mold-processing technique in the field of plastic working, and at the present time, the details thereon are not yet elucidated. However, in any case, it is presumed that when grooves 4,4 are formed on the tube body 1 by engaging the grooves 35,35 of the female rod with the convex streaks 37,37 of the male roller 28 through the tube body 1, the position corresponding to the convex streak 5 on the outer circumferential wall of the tube body 1 is pushed out from the datum level of the outer circumferential wall by pressure during engagement, thereby forming the convex streak 5 of the tube 1. In the case where a propylene-α-olefin random copolymer, propylene-α-olefin block copolymer or homopolypropylene having a melt flow index of 3 to 16 g/10 min is used as the construction material of the straw tube, the convex streak 5 projecting outward from the datum level of the outer circumferential wall of the tube body 1 can be more easily formed.

When the tube body 1 having formed on the outer circumferential wall thereof grooves 4,4 and a convex streak 5 reaches the lower portion of the rotating drum 25, the female rod 26 inserted into the tube body 1 is drawn out from the tube body 1 by the cam floor 31. As a result, the tube body falls on a belt conveyer 29 beneath the rotating drum 25 and is transported outside the tube processing device by the belt conveyer 29. Subsequently, the distal end of the tube body 1 is obliquely cut, thereby completing a straw tube.

The temperature when heating the tube body 1 by the heating roller 27 is not particularly limited; however, when the tube body 1 is heated to 70° C. to 80° C., a whitening phenomenon can be prevented. The straw tube of the present invention can be formed even without the heating step of the tube body 1; however, in view of the appearance of the straw tube, a preferred effect can be produced by using the heating roller 27.

In this tube processing device 20 and a method for producing a straw tube using the device, the female rod 26 is inserted into the tube body 1 as the rotating roller 25 rotates and then the grooves 35,35 of the female rod 26 are engaged with the convex streaks 37,37 of the male roller 28 to form grooves 4,4 and a convex streak 5 on the tube body 1, so that the straw tube can be easily and efficiently produced.

FIGS. 10(*a*)–10(*b*) and 11(*a*)–11(*b*) each is a view showing another embodiment of the straw tube of the present invention.

This two-stage straw tube 15 comprises an inner tube 2 and an outermost tube 3 different in the diameter and combined to allow free sliding for extension or retraction, two grooves 4,4 extending in the longitudinal direction thereof and a convex streak 5 sandwiched by these grooves 4,4 and projecting outward from the datum level of the outer circumferential wall are formed where on the outer circumferential wall of the outermost tube 3.

At both ends of the outermost tube 3, a restriction part 6 and a restriction part 7 are formed, and restriction parts 8,8 are formed in the distal end side on the way of the outer tube. At the basal end of the inner tube 2, a stopper part 9 is formed for preventing the slipping out of the inner tube 2 from the restriction part 6 and the restriction part 7 and for catching the inner tube 2 at the restriction parts 8,8, thereby preventing the once extended two-stage straw tube 15 from again retracting.

The lengths of the groove 4 and the convex streak 5 are not particularly limited and may be sufficient if each length is adjusted such that when the two-stage straw tube 15 is inserted into a drinking container, the convex streak 5 comes into contact with a sucking hole of the drinking container. However, in view of practical use and production, each length is preferably from ⅓ to ¾ the length of the outermost tube 3. If the lengths of the groove 4 and the convex streak 5 each is less than ⅓ the length of the outermost tube, the convex streak 5 may not come into contact with the sucking hole of the drinking container depending on the length where the two-stage straw tube 15 is inserted into the drinking container. If the lengths of the groove 4 and the convex streak 5 each exceeds ¾ the length of the outermost tube, a sufficiently secured engagement may not be attained at the joint part between the inner tube 2 and the outermost tube 3 of the two-stage straw tube 15.

The height of the convex streak 5 is not particularly limited and may be sufficient if the convex streak 5 is high enough that when the two-stage straw tube 15 is inserted into the drinking container, the convex streak 5 can expand the sucking hole of the drinking container. However, in view of practical use and production, the height of the convex streak 5 is preferably from 0.05 to 1.0 mm from the datum level of the outer circumferential wall of the outermost tube 3. If the height of the convex streak 5 is less than 0.05 mm from the datum level of the outer circumferential wall of the outermost tube 3, the effect of expanding the sucking hole of the drinking container may not be sufficiently high. If the height of the convex streak 5 exceeds 1.0 mm from the datum level of the outer circumferential wall of the outermost tube 3, the formation of the convex streak 5 becomes difficult.

The "the datum level of the outer circumferential wall" as used herein means the surface of the outer circumferential wall of the outermost tube 3 where the groove 4 and the convex streak 5 are not formed.

The depth of the groove 4 is not particularly limited and may be sufficient if the groove 4 is deep enough that when the two-stage straw tube 15 is inserted into the drinking container, the groove 4 is not accustomed to the sucking hole of the drinking container. However, in view of practical use and production, the depth of the groove 4 is preferably from 0.1 to 0.8 mm from the datum level of the outer circumferential wall of the outermost tube 3. If the depth of the groove 4 is less than 0.1 mm from the datum level of the outer circumferential wall of the outermost tube 3, the groove 4 becomes accustomed to the sucking hole of the drinking container and the void formed between the sucking hole and the groove 4 may be clogged. If the depth of the groove 4 exceeds 0.8 mm from the datum level of the outer circumferential wall of the outermost tube 3, the formation of the groove 4 becomes difficult.

The construction material of the two-stage straw tube 15 may be the same as the construction material of the straw tube in the previous embodiment.

When this two-stage straw tube 15 is inserted into a sucking hole of a drinking container body, the convex streak 5 can expand the peripheral edge of the sucking hole to form voids between the grooves 4,4 and the peripheral edge of the sucking hole, similar to the straw tube of previous embodiment. The state of the convex streak 5 expanding the peripheral edge of the sucking hole is always maintained and therefore, the peripheral edge of the sucking hole is prevented from becoming accustomed to the grooves 4,4 to clog the voids. As a result, the reduction in pressure inside the container body can be prevented and deformation of the container body or generation of uncomfortable noises can be inhibited. This two-stage straw tube can be fixed in the retracted state to the container body.

The straw tube of the present invention is not limited to the two-stage straw tube shown in the FIGS. 10 and 11, but may be a multi-stage straw tube of three or more stages.

Furthermore, the straw tube of the present invention is not limited to the example shown in the FIGS. 10 and 11, where the groove 4 and the convex streak 5 are formed on the outermost tube 3 of the two-stage straw tube, but may be a two-stage straw tube where the groove 4 and the convex streak 5 are formed on the inner tube 2.

An apparatus for producing a multi-stage straw tube and a method for producing a multi-stage straw tube using the apparatus are described below.

Examples of the apparatus for producing a multi-stage straw tube 15 include a production apparatus roughly constituted by having a tube forming device for forming an annular inner tube 2 and an outermost tube 3 each having a predetermined length, an outermost tube processing device for forming a groove 4 and a convex streak 5 on the outermost tube 3, and an assembling device for combining the inner tube 2 and the outermost tube 3 to complete a two-stage straw tube 15.

The outermost tube processing device used here can be the tube processing device 20 used in the apparatus for producing a straw tube of the previous embodiment.

A two-stage straw tube 15 is produced as follows using this apparatus for producing a double-stage straw tube.

In a tube forming device, an inner tube 2 and an outermost tube 3 each having a predetermined length are previously formed.

On the outer circumferential wall of the outermost tube 3 formed in the tube forming device, as shown in FIG. 10(*a*) and FIG. 10(*b*), two grooves 4,4 extending in the longitudinal direction thereof and a convex streak 5 sandwiched by these grooves 4,4 and projecting outward from the datum level of the outer circumferential wall are formed by the tube processing device 20 used in the apparatus for producing a straw tube of the previous embodiment.

The outermost tube 3 having formed on the outer circumferential wall thereof grooves 4,4 and a convex streak 5 is transported to the next assembling device and in this device, the inner tube 2 fed from the tube forming device and the outermost tube 3 having formed thereon grooves 4,4 and a convex streak 5 by the tube processing device 20 are combined to complete a two-stage straw tube 15.

In this tube processing device 20 and a method for producing a two-stage straw tube using the device, the female rod 26 is inserted into the outermost tube 3 as the rotating roller 25, rotates and then the grooves 35,35 of the female rod 26 are engaged with the convex streaks 37,37 of the male roller 28 to form grooves 4,4 and a convex streak 5 on the outermost tube 3. Accordingly, the two-stage straw tube 15 can be easily and efficiently produced.

EXAMPLE

An embodiment of the present invention is described using an example. Unless indicated otherwise herein, all parts, percents, ratios and the like are by weight.

A tube comprising a propylene-ethylene block copolymer having a melt flow index of 11 g/min and an ethylene content of 12% by mass was processed using a tube processing device 20 shown in FIG. 4 at a heating temperature of 80° C. for heating the outermost tube 3 by a heating roller 27 and at a processing rate of 800 tubes/min to obtain the outermost tube 3 shown in FIG. 10(*a*) and FIG. 10(*b*) where the outside diameter was 5.8 mm, the thickness was 0.26 mm, the height of the convex streak 5 was 0.5 mm, the depth of the groove 4 was 0.6 mm, and the length of the convex streak 5 and the groove 4 was each 36 mm. A whitening phenomenon was not observed in the part of convex streak 5 and groove 4 of this outermost tube 3.

Subsequently, this outermost tube 3 and an inner tube 2 were combined to manufacture a two-stage straw tube 15, which was actually inserted into a drinking container, and the drink was sucked, and as a result, reduction in the pressure did not occur within the drinking container.

As described previously, the straw tube of the present invention has grooves formed on the outer circumferential wall of the tube and extending in the longitudinal direction and a convex streak adjacent to these grooves and projecting outward from the datum level of the outer circumferential wall, so that the pressure inside a drinking container can be prevented from decreasing when sucking a drink in the drinking container. By virtue of this effect, the drink in the drinking container can be easily sucked and generation of uncomfortable noises can be inhibited.

Also, the straw tube of the present invention has a plurality of grooves formed on the outer circumferential wall of the tube and extending in the longitudinal direction and a convex streak sandwiched by these grooves and projecting outward from the datum level of the outer circumferential wall, so that the pressure inside a drinking container can be prevented from decreasing when sucking a drink in the drinking container. By virtue of this effect, the drink in the drinking container can be easily sucked and generation of uncomfortable noises can be inhibited.

In the case where the straw tube of the present invention is a multistage straw tube comprising two or more tubes different in the diameter and combined to allow free sliding for the extension or retraction, the pressure inside a drinking container can be prevented from decreasing when sucking a drink in the drinking container and the straw tube can be fixed in the retracted state to a container body.

In the case where grooves and a convex streak are formed on the peripheral wall of the outermost tube positioned in the outermost side out of the above-described two or more tubes, the drink within the drinking container can be easily sucked and at the same time, the above-described effects can be provided.

In the case where the number of grooves is 2 and one convex streak is formed between these grooves adjacent thereto, formation of the grooves and convex streak can be facilitated.

In the case where the lengths of the groove and the convex streak each is from ⅓ to ¾ the length of the tube on which the groove and convex streak are formed, reduction of the pressure inside the drinking container can be prevented without impairing the function of the straw tube.

In the case where the height of the convex streak is from 0.05 to 1.0 mm from the datum level of outer circumferential wall of the tube on which the convex streak is formed, a sufficiently high effect of preventing reduction of the pressure and an effect of facilitating the formation of a convex streak can both be obtained at the same time.

In the case where the depth of the convex streak is from 0.1 to 0.8 mm from the datum level of outer circumferential wall of the tube on which the groove is formed, a sufficiently high effect of preventing reduction of the pressure and an effect of facilitating the formation of a groove can both be obtained at the same time.

In the case where the construction material of the straw tube is a propylene-α-olefin random copolymer, propylene-α-olefin block copolymer or homopolypropylene having a melt flow index of 3 to 16 g/10 min, a convex streak can be easily formed to project from the datum level of outer circumferential wall without crushing out the grooves when processing the straw tube.

In the case where the propylene-α-olefin random copolymer or the propylene-α-olefin block copolymer is a propylene ethylene random copolymer or a propylene ethylene block copolymer, a convex streak can be more easily formed to project from the datum level of outer circumferential wall when processing the straw tube.

In the case where the ethylene content of the propylene ethylene random copolymer or propylene ethylene block copolymer is from 2 to 20% by mass, a convex streak can be formed to project from the datum level of the outer circumferential wall without causing whitening in the parts of the convex streak and grooves when processing the straw tube.

The apparatus for producing the straw tube of the present invention comprises a rotating drum having formed on the outer circumferential wall thereof a plurality of tube loading grooves into which tubes are loaded and which extend in the axial direction, a female rod capable of being inserted into or drawn out from a tube within the tube loading groove by the reciprocation of a cam mechanism and having a plurality of grooves formed at the position corresponding to the surface of a tube exposed from the tube loading groove, and a male roller having a male mold which has convex streaks corresponding to the grooves of said female rod provided at a plurality of positions on the circumferential wall. The male roller is disposed such that the grooves of the female rod and the convex streaks of the male roller engage through a tube and the female rod and the male roller are synchronized, so that a straw tube capable of preventing the pressure inside a drinking container from decreasing when sucking a drink in the drinking container can be easily and efficiently produced.

The method for producing a straw tube of the present invention comprises a step of loading a tube into a tube loading groove formed on the outer circumferential wall of a rotating drum and extending in the axial direction thereof, a step of inserting into the tube a female rod having a plurality of grooves formed at the position corresponding to the surface of the tube exposed from the tube loading grooves, and a step of engaging the grooves of the female rod within the tube and the convex streaks of a male mold provided on a male roller, through the tube, so that a straw tube capable of preventing the pressure inside a drinking container from decreasing when sucking a drink in the drinking container can be easily and efficiently produced.

In the case where the female rod has two grooves and the male mold provided on the male roller has two convex streaks, a straw tube can be more easily produced.

While the invention has been described in detail and with reference to specific embodiments thereof, it will be apparent to one skilled in the art that various changes and modifications can be made therein without departing from the spirit and scope thereof.

What is claimed is:

1. A straw tube comprising a tube comprising a plurality of grooves extending in a longitudinal direction and a convex streak sandwiched by these grooves and a cylindrical tube body where said grooves and said convex streak are not formed, wherein each of said grooves and convex streak has a length of ⅓ to ¾ the tube, each of said grooves is deeper than a surface of an outer circumferential wall of the tube body, and said convex streak projects outward from the surface of the outer circumferential wall of the tube body.

2. The straw tube as claimed in claim 1, wherein material for the straw tube comprises a homopolypropylene having a melt flow index of 3 to 16 g/10 min.

3. The straw tube as claimed in claim 1, which is a multistage straw tube comprising two or more tubes different in a diameter and combined to allow free sliding for extension or retraction.

4. The straw tube as claimed in claim 3, wherein a groove and a convex streak are on the outer circumferential wall of at least one tube of said two or more tubes.

5. The straw tube as claimed in claim 3, wherein a groove and a convex streak are on the outer circumferential wall of an outermost tube located on an outermost side of said two or more tubes.

6. The straw tube as claimed in claim 1, wherein a number of grooves is two and one convex streak is formed between and adjacent to these grooves.

7. The straw tube as claimed in claim 1, wherein material for the straw tube comprises a propylene-α-olefin block copolymer having a melt flow index of 3 to 16 g/10 min.

8. The straw tube as claimed in claim 1, wherein said convex streak has a height of 0.05 to 1.0 mm from the surface of the outer circumferential wall of the tube body.

9. The straw tube as claimed in claim 1, wherein each groove has a depth of 0.1 to 0.8 mm from the surface of the outer circumferential wall of the tube body.

10. The straw tube as claimed claim 1, wherein material for the straw tube comprises a propylene-α-olefin random copolymer having a melt flow index of 3 to 16 g/10 min.

11. The straw tube as claimed in claim 10, wherein said propylene-α-olefin random copolymer is a propylene-ethylene random copolymer.

12. The straw tube as claimed in claim 11, wherein the ethylene content of said propylene-ethylene random copolymer is from 2 to 20% by mass.

13. The straw tube as claimed in claim 7, wherein said propylene-α-olefin block copolymer is a propylene-ethylene block copolymer.

14. The straw tube as claimed in claim 13, wherein the ethylene content of said propylene-ethylene block copolymer is from 2 to 20% by mass.

* * * * *